US011810413B1

(12) United States Patent
Salazar et al.

(10) Patent No.: US 11,810,413 B1
(45) Date of Patent: Nov. 7, 2023

(54) SYSTEMS AND METHODS FOR MANAGING INDIVIDUAL ENROLLMENT DATA

(71) Applicant: United Services Automobile Association (USAA), San Antonio, TX (US)

(72) Inventors: Gabrielle Diane Salazar, San Antonio, TX (US); Dustin Bowen Bitter, Lehi, UT (US); Mitzi Ruiz, San Antonio, TX (US); Jeanie Graciela Lopez, San Antonio, TX (US); Oscar Guerra, San Antonio, TX (US); William Daniel Farmer, Carrollton, TX (US); Jennifer Marie Chandler-Bradley, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/851,489

(22) Filed: Jun. 28, 2022

(51) Int. Cl.
*G07C 9/25* (2020.01)
*G07C 9/00* (2020.01)
*G06V 40/50* (2022.01)

(52) U.S. Cl.
CPC .............. *G07C 9/25* (2020.01); *G06V 40/50* (2022.01); *G07C 9/00309* (2013.01)

(58) Field of Classification Search
None
See application file for complete search history.

(56) References Cited

U.S. PATENT DOCUMENTS

| | | | | |
|---|---|---|---|---|
| 9,786,107 B2* | 10/2017 | Mahar | ....................... | G07C 9/37 |
| 9,953,187 B2* | 4/2018 | Rylski | ................. | G06V 40/172 |
| 10,447,736 B1* | 10/2019 | Jiang | .................... | H04L 63/0861 |
| 10,460,540 B2* | 10/2019 | Mahar | ....................... | G07C 9/38 |
| 10,789,820 B1* | 9/2020 | Jones | ................ | G07C 9/00571 |
| 10,854,028 B2* | 12/2020 | Beavers | ............. | G07C 9/00571 |
| 11,392,998 B1* | 7/2022 | Kwak | ................ | G06Q 30/0278 |
| 11,501,590 B2* | 11/2022 | LaRovere | ................ | G07C 1/32 |
| 11,610,238 B1* | 3/2023 | Kwak | .................... | G06V 20/20 |
| 2014/0310188 A1* | 10/2014 | Preuss | .................. | G06Q 50/163 |
| | | | | 705/314 |
| 2016/0005247 A1* | 1/2016 | Mehl | ........................ | G07C 9/28 |
| | | | | 340/5.61 |
| 2016/0148016 A1* | 5/2016 | Rylski | ................. | G06F 21/6245 |
| | | | | 348/143 |
| 2016/0247340 A1* | 8/2016 | Mahar | ....................... | G07C 9/37 |
| 2018/0047227 A1* | 2/2018 | Beavers | .................. | G06F 21/35 |

(Continued)

*Primary Examiner* — Carlos Garcia
(74) *Attorney, Agent, or Firm* — Fletcher Yoder, P.C.

(57) ABSTRACT

An enrollment data management system includes one or more processors and memory storing instructions executable by the one or more processors to cause the one or more processors to receive sensor data from one or more sensors located at a property, wherein the sensor data indicates a plurality of individual detection events that each indicate presence of an individual at the property. The instructions are executable by the one or more processors to cause the one or more processors to analyze the sensor data to determine that the property qualifies as a residence of the individual, access information relevant to the property from one or more databases, utilize the information relevant to the property as enrollment information for an enrollment process for the individual.

20 Claims, 4 Drawing Sheets

(56) References Cited

U.S. PATENT DOCUMENTS

2018/0096548 A1* 4/2018 Mahar ................. G07C 9/37
2023/0177956 A1* 6/2023 O'Sullivan ............ G06Q 10/02
701/37

* cited by examiner

SYSTEMS AND METHODS FOR MANAGING INDIVIDUAL ENROLLMENT DATA

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statement are to be read in this light, and not as admission of prior art.

Companies collect data related to individuals for various purposes. For example, a company may request that an individual provide certain personal information prior to the company providing a service to the individual, completing a transaction with the individual, accepting a job application from the individual, and so forth. In particular, the company may request that the individual write the personal information on a paper form or type the personal information into an electronic form, and then the company may review and verify (e.g., by calling references, reviewing public records, and/or completing a background check) the personal information prior to providing the service to the individual, completing the transaction with the individual, accepting the job application from the individual, and so forth.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an enrollment data management system includes one or more processors and memory storing instructions executable by the one or more processors to cause the one or more processors to receive sensor data from one or more sensors located at a property, wherein the sensor data indicates multiple individual detection events that each indicate presence of an individual at the property. The instructions are executable by the one or more processors to cause the one or more processors to analyze the sensor data to determine that the property qualifies as a residence of the individual, access information relevant to the property from one or more databases, utilize the information relevant to the property as enrollment information for an enrollment process for the individual.

In one embodiment, a method of operating an enrollment data management system includes receiving, at one or more processors, sensor data from one or more sensors located at a property, wherein the sensor data indicates multiple individual detection events that each indicate presence of an individual at the property. The method also includes analyzing, via the one or more processors, the sensor data to determine that the property qualifies as a residence of the individual. The method further includes accessing, via the one or more processors, information relevant to the property from one or more databases. The method further includes utilizing, via the one or more processors, the information relevant to the property as enrollment information for an enrollment process for the individual.

In one embodiment, an enrollment data management system includes one or more processors and memory storing instructions executable by the one or more processors to cause the one or more processors to receive sensor data from one or more sensors located at one or more properties, wherein the sensor data indicates multiple individual detection events that each indicate presence of an individual at the one or more properties. The instructions are executable by the one or more processors to cause the one or more processors to receive mobile device data from a mobile device associated with the individual, wherein the mobile device data indicates multiple mobile device detection events that each indicate presence of the mobile device at the one or more properties. The instructions are executable by the one or more processors to cause the one or more processors to analyze the sensor data, the mobile device data, or both to identify a first property of the one of the one or more properties as a residence of the individual, access information relevant to the first property of the one or more properties from one or more databases, and generate enrollment information based on the information relevant to the first property of the one or more properties as part of an enrollment process for the individual.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
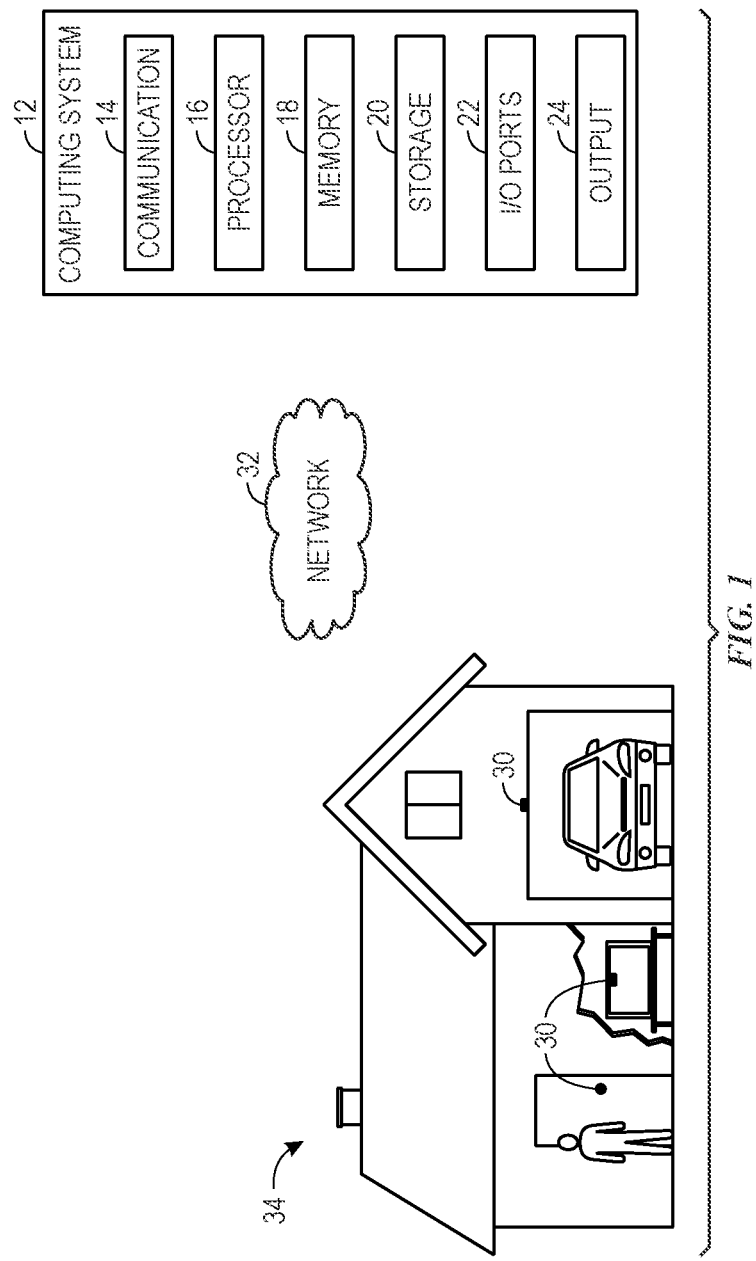
FIG. 1 is a schematic diagram of an enrollment data management system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A company may request that an individual (e.g., individual, person) provide certain personal information prior to the company providing a service to the individual, completing a transaction with the individual, accepting a job application from the individual, and so forth. It is presently recognized that an enrollment process for the individual to provide the personal information to the company may be made more efficient by collecting and analyzing various types of data, including passively-collected data (e.g., by the individual carrying out their typical tasks, such as locking/unlocking doors, making calls with a mobile phone, and/or traveling to different locations). As a more specific example, the various types of data may include sensor data obtained by one or more sensors at a residential location associated with the individual (e.g., a door lock sensor that detects the individual locking and/or unlocking the door at times expected for someone who resides at the residential location, which indicates that the individual resides at the residential location) and/or mobile device data obtained by one or more mobile devices associated with the individual (e.g., a global positioning sensor of a mobile phone associated with the individual that detects that the mobile phone is at the residential location at more than 90 percent of nighttime hours, which indicates that the individual resides at the residential location).

Accordingly, present embodiments relate to an enrollment data management system that receives sensor data from one or more sensors at any of a variety of locations (e.g., residential locations, commercial locations) and/or mobile device data from one or more mobile devices. The enrollment data management system includes a computing system that receives and processes the sensor data and/or the mobile device data to determine enrollment information for the individual. The enrollment information may include a residential address for the individual, a place of employment for the individual, a travel location for the individual, relationships between the individual and other individuals, and so forth. In certain embodiments, the computing system may populate an enrollment form with the enrollment information, and the enrollment form may then be presented on a display for visualization by the individual and/or a representative of the company. The display may prompt input for modification or confirmation of the provided information.

In certain embodiments, the computing system may utilize the enrollment information to take some action, such as to provide the service to the individual, complete the transaction with the individual, accept the job application from the individual, and so forth. For example, in response to determining the enrollment information (e.g., satisfactory enrollment information, such as enrollment information that establishes the residential address of the individual), the computing system may generate an insurance policy for individual and/or open a bank account for the individual. It is envisioned that the enrollment information determined in this manner (e.g., based on the sensor data and/or the mobile device data) may satisfy regulations (e.g., company and/or government regulations) related to various enrollment processes, such as regulations that call for proof/verification of the residential address of the individual in order to open a bank account for the individual. Indeed, the enrollment information determined in this manner may be used alone and/or in lieu of other types of documents, data, and/or information (e.g., the sensor data and/or the mobile device data may be used as proof/verification instead of, for example, a utility bill with a name of the individual and the residential address).

With the foregoing in mind, FIG. 1 is a schematic diagram of an enrollment data management system 10, in accordance with an embodiment of the present disclosure. The enrollment data management system 10 may include a computing system 12 that includes a communication device 14, a processor 16, a memory device 18, a storage device 20, input/output (I/O) ports 22, and/or an output device 24. The enrollment data management system 10 may include or be communicatively coupled to one or more sensors 30 that provide sensor data to the computing system 12 via a network 32 (e.g., the Internet).

As shown, the one or more sensors 30 may be located at or near a building 34 (e.g., a residential building, such as a house; a property). The one or more sensors 30 may be associated with the building 34, such as via a registration process that links the one or more sensors 30 to the building 34 and/or via transmission of location data with the sensor data. For example, an individual may install the one or more sensors 30 in the building 34 and then use an application (e.g., software application) running on a personal computing device (e.g., a mobile device or a desktop computer) to register the one or more sensors 30 by inputting, among other information, a street address of the building 34. As another example, the individual may install the one or more sensors 30 in the building 34, and at least one of the one or more sensors 30 may include a global positioning system (GPS) sensor. In such cases, the at least one of the one or more sensors 30 may transmit the location data (e.g., GPS data) with the sensor data, and the computing system 12 may reference one or more databases (e.g., included in the storage device 20 or otherwise accessible to the processor 16) that stores street addresses with corresponding location data to identify a street address of the building 34 based on the location data. In some such cases, the other sensors 30 may be linked to the at least one of the one or more sensors 30 so that the computing system 12 recognizes that each of the one or more sensors 30 are located at the building 34. It should be appreciated that the street addresses and/or the location data may also be stored in association with other relevant information and/or used to look up other relevant information in the one or more databases. The other relevant information may include any information relevant to and/or about the building (e.g., age, construction materials, foundation type, size, registered owner, sale history, flood history for the building, damage history for the building, insurance claim history for the building, weather history for a region that includes the building, crime event history for the region that includes the building)

The enrollment data management system 10 may be configured to facilitate efficient enrollment processes. In certain embodiments, the individual may initiate the collection of the sensor data by the one or more sensors 30 and/or the transfer of the sensor data to the computing system 12.

For example, the individual may initiate this by submitting a request for enrollment to a company (e.g., a financial institution, an insurance company, or other organization). The individual may submit the request for enrollment by downloading an application (e.g., software application) associated with the company onto the personal computing device, communicating the request via a phone call to the company, or otherwise indicating a desire to complete the enrollment with the company (e.g., visiting a website associated with the company; clicking a link or an icon in a notification).

As part of the request for enrollment, the individual may grant authorization for the computing system 12 to communicate with the one or more sensors 30 or to otherwise obtain the sensor data. Further, in response to the request for enrollment, the computing system 12 may establish communication with the one or more sensors 30, send instructions to the one or more sensors 30 to begin collection of the sensor data, and/or send instructions to the one or more sensors 30 to transfer the sensor data to the computing system 12. It should be appreciated that the computing system 12 may communicate with the one or more sensors 30 directly or through any suitable intermediary device(s), such as a hub installed at the building 34 and/or the personal computing system of the individual.

The one or more sensors 30 may include any of a variety of imaging devices (e.g., cameras), smart locks, smart appliances, smart televisions, biometric sensor, smart garage door systems, and/or other types of sensors. For example, the one or more sensors 30 may capture an image of the individual each time the individual passes through a door to enter the building 34. The computing system 12 may receive the image and compare the image to a stored image (e.g., in the one or more databases) to determine that the individual entered the building 34 at a particular time. Thus, over the course of a day, the one or more sensors 30 may capture multiple images that show patterns of behavior, such as exit from the building 34 in the morning, exit and entry from the building 34 a few times throughout the day, and then entry to the building 34 in the evening before nighttime hours. The patterns of behaviors may correspond to patterns of behaviors expected from someone who resides in the building 34, and thus, the computing system 12 may determine that the individual resides in the building 34.

It should be appreciated that the one or more sensors 30 may also capture a vehicle image of a vehicle associated with the individual each time the vehicle passes through a garage door to enter the building 34 (or otherwise parks/drives away from the building 34). The computing system 12 may receive the vehicle image and compare the vehicle image to a stored vehicle image (e.g., in one or more databases, which may be included in the storage device 20 or otherwise accessible to the processor 16) to determine that the vehicle entered the building 34 at a particular time. Thus, over the course of a day, the one or more sensors 30 may capture multiple vehicle images that show patterns of behavior, such as exit from the building 34 in the morning, exit and entry from the building 34 a few times throughout the day, and then entry to the building 34 in the evening before nighttime hours. The patterns of behaviors may correspond to patterns of behaviors expected by the vehicle of the individual who resides in the building 34, and thus, the computing system 12 may determine that the vehicle belongs to the individual who resides in the building 34, and that the building 34 should be designated as a primary location for the vehicle. The images and the vehicle images (e.g., their timestamps) may also be directly compared to associate the individual with the vehicle (e.g., via repeated entry and exit at corresponding times).

Similarly, the one or more sensors 30 may include smart locks that receive individual-specific codes and/or biometric data to unlock and/or lock doors to the building 34. For example, the one or more sensors 30 may include a smart lock on a door of the building 34, and the smart lock is configured to unlock the door to allow entry to the building 34 upon entry of an individual-specific code for the individual. The individual-specific code may be assigned to the individual and/or created by the individual, and then the individual-specific code may be associated with the individual in the one or more databases. Similarly, the smart lock may be configured to unlock the door upon entry of an individual-specific biometric data, such as a fingerprint or an iris-scan. The individual-specific code may be assigned to the individual and/or created by the individual, and then the individual-specific code may be associated with the individual in the one or more databases.

Similarly, the one or more sensors 30 may include smart televisions that receive individual-specific codes to access certain applications (e.g., with channels and/or programming) on the smart televisions. For example, the one or more sensors 30 may include a smart television in a living room of the building 34, and the smart television is configured to provide access to one streaming application upon input of an individual-specific code for the individual to the smart television. The individual-specific code may be assigned to the individual and/or created by the individual, and then the individual-specific code may be associated with the individual in the one or more databases. Any of a variety of other types of sensors may be used in similar ways to identify the presence of the individual at the building 34, the presence of the vehicle at the building 34, association between the individual and the vehicle, and so forth. The instances of detection of the individual may be considered detection events that each indicate the presence of the individual (e.g., at the building 34 at a time of detection).

It should be appreciated that the one or more sensors 30 may be part of a sensor system (e.g., home security system) that carries out certain aspects of the techniques described herein. For example, the sensor system may include a respective computing system that compares the image data to the stored image data to detect the individual in the building 34, and/or that compares the vehicle image data to the stored vehicle image data to detect the vehicle in the building 34. As another example, the sensor system may include the respective computing system that compares an entered code to the individual-specific code in the one or more databases to detect that the individual interacted with the smart lock and/or the smart television, and/or that compares a biometric scan to the biometric data in the one or more databases to detect that the individual interacted with the smart lock (or is otherwise at the building 34).

In such cases, the respective computing system may transmit an indication of the presence of the individual and/or the vehicle at the building 34. For example, instead of merely transmitting the image to the computing system 12, the respective computing system may transmit the indication that the individual was detected via the images and/or the biometric scan at the smart lock at 8:00 am, the individual was detected via the individual-specific code at the smart television at 8:30 am, the individual was detected via the images at 12:00 pm, and so forth. It should be appreciated that the information may be more specific to include entry and exit at the building 34, such as that the individual was detected entering the building 34 via the images and/or the biometric scan at the smart lock at 8:00 am, the individual was detected via the individual-specific code at the smart television at 8:30 am, the individual was detected exiting the building 34 via the images at 12:00 pm, and so forth. Further, these techniques may be carried out for multiple different individuals at the building 34, for the individual at multiple different buildings, and/or multiple different individuals at multiple different buildings to capture and collect sensor data and information that reflect the patterns in behavior. In turn, the patterns in behavior may be analyzed by the computing system 12 to determine enrollment information (e.g., residential address as related information, primary vehicle, vehicle primary location) for the individual and/or for each of the multiple individuals. As discussed in more detail herein, the enrollment information may be used to populate an enrollment form for the company and/or for display. In certain embodiments, the enrollment information may satisfy regulations related to the enrollment process and/or may be used to complete enrollment with the company.

Figure 2:
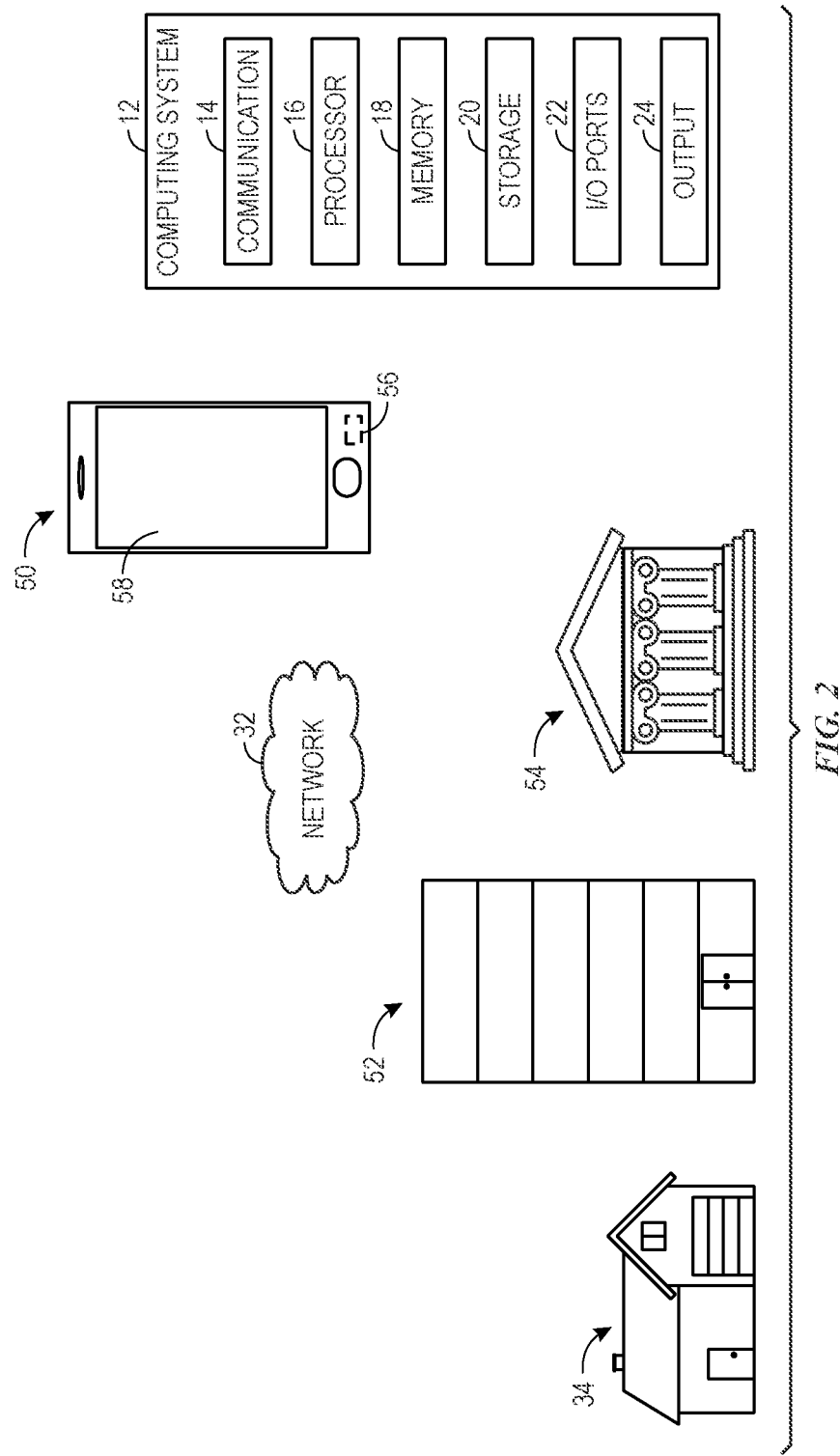
FIG. 2 is a schematic diagram of the enrollment data management system of FIG. 1 in communication with a mobile device of an individual, in accordance with an embodiment of the present disclosure.

FIG. 2 is a schematic diagram of the enrollment data management system 10 in communication with a mobile device 50 of the individual, in accordance with an embodiment of the present disclosure. In addition to or instead of the sensor data from the one or more sensors 30 of FIG. 1, the enrollment data management system 10 may utilize mobile device data from one or more mobile devices, such as the mobile device 50, associated with the individual (e.g., carried by the individual, registered to the individual, or otherwise associated with the individual). The mobile device 50 may include a mobile phone, a tablet, a smartwatch, a laptop computer, or the like.

As shown, the mobile device 50 may be carried by the individual to multiple different locations, including the building 34, a commercial building 52 (e.g., office building; a property), and/or an additional building 54 (e.g., additional location; represented as an additional building, but this could be any specific or general additional geographic location, such as a particular building, a particular city, a particular state, a particular country; a property). The mobile device 50 may include a location tracking device 56 (e.g., GPS sensor) that periodically or continuously outputs location data (e.g., GPS data). It should be appreciated that the location of the mobile device 50 may be tracked via any of a variety of suitable techniques, such as via communication between the mobile device 50 (e.g., Bluetooth communication, radiofrequency communication) and respective communication devices within the buildings 34, 52, 54. Then, the respective communication devices within the buildings 34, 52, 54 transmit an indication of the communication with the mobile device 50 (and thus, the presence of the mobile device 50) to the computing system 12. The instances of detection of the mobile device 50 may be considered detection events that each indicate the presence of the mobile device (e.g., at the buildings 34, 52, 54 at a time of detection). It should be appreciated that the respective communication devices may be linked to the buildings 34, 52, 54 via a registration process and/or via transmission of their location data with the indication of the communication with the mobile device 50. In this way, the computing system 12 may receive the mobile device data that indicates the location of the mobile device 50.

Further, the computing system 12 may reference the one or more databases that stores the street addresses with corresponding location data to identify a street address of the buildings 34, 52, 54 based on the location data. For example, when the mobile device 50 is detected as being present at the building 34 at some time (e.g., a point in time or over a time period), the computing system 12 receives the mobile device data that indicates the location of the mobile device 50 and references the one or more databases to determine the respective street address of the building 34. The computing system 12 may therefore determine that the individual associated with the mobile device 50 was present at the respective street address for the building 34 at the time. Similarly, when the mobile device 50 is detected as being present at the commercial building 52 at some other time (e.g., another point in time or over another time period), the computing system 12 receives the mobile device data that indicates the location of the mobile device 50 and references the one or more databases to determine the respective street address of the commercial building 52. The computing system 12 may therefore determine that the individual associated with the mobile device 50 was present at the respective street address for the commercial building 52 at the time. Similarly, when the mobile device 50 is detected as being present at the additional building 54 at some additional time (e.g., additional point in time or over an additional time period), the computing system 12 receives the mobile device data that indicates the location of the mobile device 50 and references the one or more databases to determine the respective street address of the additional building 54. The computing system 12 may therefore determine that the individual associated with the mobile device 50 was present at the respective street address for the additional building 54 at the additional time. As noted herein, the computing system 12 may also access any of a variety of other information relevant to the buildings 34, 52, 54 from the one or more databases based on the street address and/or the location data, for example.

As noted herein, the enrollment data management system 10 may be configured to facilitate efficient enrollment processes. In certain embodiments, the individual may initiate the collection of the mobile device data and/or the transfer of the mobile device data to the computing system 12. For example, the individual may initiate this by submitting the request for enrollment to the company. As part of the request for enrollment, the individual may grant authorization for the computing system 12 to communicate with the mobile device 50 or to otherwise access the mobile device data. Further, in response to the request for enrollment, the computing system 12 may establish communication with the mobile device 50, send instructions to the mobile device 50 to begin collection of the mobile device data, and/or send instructions to the mobile device 50 to transfer the mobile device data to the computing system 12. It should be appreciated that the computing system 12 may communicate with the mobile device 50 directly or through any suitable intermediary device(s), such as the transceivers installed in the buildings 34, 52, 54, communication towers, relay devices, and so forth.

Thus, over the course of multiple days, the mobile device data may show patterns of behavior, such as exit from the building 34 each morning, entry to the commercial building 52 a short time later each morning, and then entry to the building 34 each evening before nighttime hours. The patterns of behaviors may correspond to patterns of behaviors expected from someone who resides in the building 34 and works in the commercial building 52, and thus, the computing system 12 may determine that the individual resides in the building 34 and works in the commercial building 52. As another example, the mobile device data may show entry to the additional building 54, which is located in a different country than the building 34. Thus, the computing system 12 may determine that the mobile device data indicates that the individual has traveled to the different country. Travel may be relevant for certain enrollment processes, such as life insurance enrollment processes that inquire about prior travel.

It should be appreciated that these techniques may be carried out for multiple different individuals at the buildings 34, 52, 54 to capture and collect respective mobile device data for respective mobile devices 50 associated with the multiple different individuals. In turn, the patterns in behavior reflected by the mobile device data may be analyzed by the computing system 12 to determine enrollment information (e.g., residential address, primary vehicle, vehicle primary location) for the individual and/or for each of the multiple individuals. As discussed in more detail herein, the enrollment information may be used to populate the enrollment form for the company and/or for display. For example, the enrollment form may be displayed on a display screen 58 of the mobile device 50 for visualization by the individual. Indeed, this may enable the individual to review the enrollment form and confirm the enrollment information for submission to the company for review/acceptance. As another example, the enrollment form may be displayed on the output device 24 for visualization by a representative of the company. In certain embodiments, the enrollment information may satisfy regulations related to the enrollment process and/or may be used to complete enrollment with the company.

It should be appreciated that the enrollment data management system 10 may have other features. In certain embodiments, the mobile device data may include unlock and/or lock activity of the mobile device 50, which may provide information (e.g., proof/verification) that the individual is carrying the mobile device 50 and is co-located with the mobile device 50 (e.g., at the buildings 34, 52, 54 at the time of detection). For example, the mobile device 50 may be in a locked configuration (e.g., locked state) when the mobile device 50 is first detected in the commercial building 52. However, the mobile device 50 may be unlocked to an unlocked configuration (e.g., unlocked state) at some later time when the mobile device 50 is still detected in the commercial building 52. The mobile device 50 may be unlocked via entry of an individual-specific code and/or biometric data, and thus, the computing system 12 may receive an indication of an identity of the individual who is co-located with the mobile device 50. In this way, computing system 12 may confirm the location of the individual and determine the enrollment information (e.g., with high confidence).

In certain embodiments, the mobile device data may include metadata extracted from posts entered on social media platforms and/or other platforms, as this may provide information (e.g., proof/verification) that the individual is carrying the mobile device 50 and is co-located with the mobile device 50 (e.g., at the buildings 34, 52, 54). For example, the mobile device 50 may be used to access and post a comment on a particular social media platform, and the mobile device data may include the metadata that indicates a profile associated with the comment and the individual associated with the profile (e.g., and thus, it is likely that the individual made the comment and the individual should be considered to be co-located with the mobile device 50 at the time of the comment). In certain embodiments, the mobile device data may include an ad hit source that indicates the location of the mobile device 50 (e.g., indicates that the individual interacted with an ad when present at a particular location). In certain embodiments, the mobile device data may include other scraped data, such as via scraping emails, files, and the like stored on the mobile device 50. This may reveal banking documents (e.g., statement), tax documents (e.g., tax forms, tax returns), bills (e.g., utility bills), and so forth. It should be appreciated that the computing system 12 may also be configured to receive such scraped data from any personal computing device of the individual (e.g., the desktop computer). In certain embodiments, the mobile device data may include a "home" location or a "work" location set in a mapping application on the mobile device 50, and the computing system 12 may use the "home" location to determine and/or to confirm that the individual resides at the "home" location (e.g., it matches the building 34) and/or that the individual works at the "work" location (e.g., it matches the commercial building 52).

Additionally, the enrollment data management system 10 may utilize one or more thresholds and/or one or more algorithms (e.g., machine learning algorithms) to assess the patterns of behaviors to determine residency, place of employment, and so forth. For example, the enrollment data management system 10 may determine a total number of overnight hours at the building 34 over a respective time period (e.g., 70 hours over a 7 day time period), compare the total number of overnight hours to a residence threshold (e.g., 60 hours), and then determine that the building 34 qualifies as the residence of the individual in response to the total number of overnight hours at the building 34 over the respective time period being equal to or greater than the residence threshold. The residence threshold may be set to be 75, 80, 85, 90, or 95 percent of a block of overnight hours (e.g., 7 pm-7 am). Similarly, the enrollment data management system 10 may determine a total number of daytime hours at the commercial building 52 over a respective time period (e.g., 40 hours over a 5 day time period), compare the total number of overnight hours to an employment threshold (e.g., 38 hours), and then determine that the commercial building 52 qualifies as the place of employment of the individual in response to the total number of daytime hours at the commercial building 52 over the respective time period being equal to or greater than the employment threshold. The employment threshold may be set to be 75, 80, 85, 90, or 95 percent of a block of daytime hours on business days (e.g., 7 am-7 pm, Monday through Friday).

It should be appreciated that the residence threshold and/or the employment threshold may be more complex. For example, the residence threshold may be set to be 75, 80, 85, 90, or 95 percent of the block of overnight hours (e.g., 7 am-7 pm) over a 30 day period (e.g., 75, 80, 85, 90, or 95 percent of 360 hours over the 30 day period). The residence threshold and/or the employment threshold may also be adjusted and/or personalized for the individual (e.g., to account for different work schedules, such as flexible shift work and/or overnight shifts). The residence threshold and/or the employment threshold may be adjusted and/or personalized for the individual based on inputs (e.g., keyed inputs) received from the individual (e.g., via the mobile device 50). In certain embodiments, the residence threshold and/or the employment threshold may be dynamically generated for the individual based on the sensor data and/or the mobile device data collected over an initial time period (e.g., the sensor data and/or the mobile device data suggest that the individual works overnight shifts, and thus, the residence threshold and/or the employment threshold are adjusted accordingly for a data collection period).

As another example, the one or more algorithms may be trained (e.g., on training data) to recognize patterns in the sensor data and/or the mobile device data (e.g., patterns in the behavior of the individual, as indicated by the sensor data and/or the mobile device data). The one or more algorithms may determine (e.g., predict) that the building 34 qualifies as the residence of the individual and/or that the commercial building 52 qualifies as the place of employment of the individual based on analysis of the sensor data and/or the mobile device data (e.g., analysis of the patterns in the behavior of the individual, as indicated by the sensor data and/or the mobile device data).

In certain embodiments, such as during availability of particular known examples that correlate to future predictions, supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Supervised learning algorithms include classification and regression. Classification algorithms are used when the outputs are restricted to a limited set of values, and regression algorithms are used when the outputs may have any numerical value within a range. Further, similarity learning is an area of supervised machine learning closely related to regression and classification, but the goal is to learn from examples using a similarity function that determines the extent in which two objects are similar or related.

Additionally and/or alternatively, in some situations, it may be beneficial to utilize unsupervised learning (e.g., when particular output types are not known). Unsupervised learning algorithms take a set of data that contains only inputs and find structure in the data, such as grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data. In any case, machine learning may be used to identify residence locations, work locations, and/or other enrollment data for one or more individuals. In certain embodiments, the algorithms are updated over time (e.g., based on new data from the one or more individuals; the new data from the one or more individuals is used as training examples to update and improve the algorithms over time).

Figure 3:
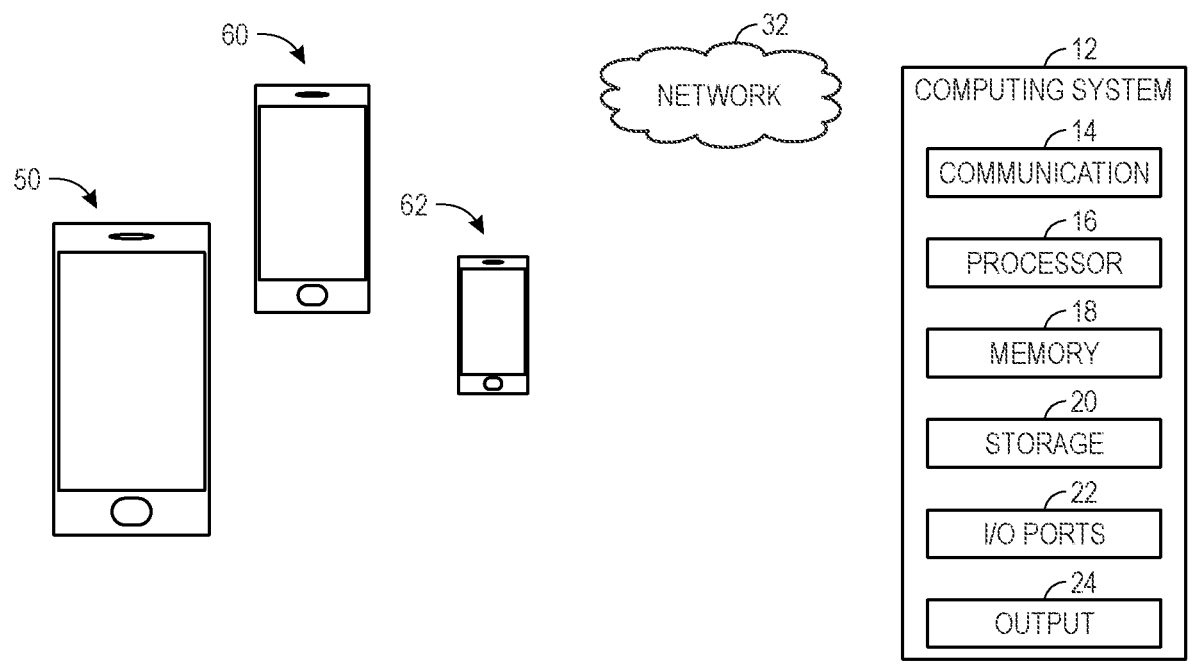
FIG. 3 is a schematic diagram of the enrollment data management system of FIG. 1 in communication with multiple mobile devices of multiple individuals, in accordance with an embodiment of the present disclosure.

FIG. 3 is a schematic diagram of the enrollment data management system 10 in communication with multiple mobile devices of multiple individuals, in accordance with an embodiment of the present disclosure. The multiple devices may include the mobile device 50 associated with the individual (which may also be considered to be "the first mobile device associated with the first individual"), a second mobile device 60 associated with a second individual, a third mobile device 62 associated with a third individual, and so on. Calls (e.g., voice and/or video calls) and/or texts between the mobile devices 50, 60, 62 may be recorded (e.g., logged or stored) locally on the mobile devices 50, 60, 62 and/or in one or more databases that are otherwise accessible to the mobile devices 50, 60, 62 and/or the computing system 12 (e.g., stored in the one or more databases in a cloud storage and/or other data source, such as a mobile service provider source). Other relevant records and information, such as registered owners of the mobile devices 50, 60, 62, may be stored in and accessed from the one or more databases. Further, the techniques disclosed herein may be used to determine that the first individual, the second individual, and/or the individual share a residence and/or a place of employment.

Thus, the computing system 12 may receive the mobile device data that includes records related to communication between the mobile devices 50, 60, 62. The computing system 12 may process the mobile device data to determine and/or to confirm relationships between the individuals associated with the mobile devices 50, 60, 62. For example, the first mobile device 50 and the second mobile device 60 may connect for voice calls every evening, which may indicate a close relationship (e.g., familial relationship) between the first individual and the second individual. In some cases, the first mobile device 50 may store or otherwise provide contact information associated with the second mobile device 60, and the contact information may have a label that indicates a relationship between the first individual and the second individual (e.g., the label of "Mom" indicates that the second individual is the mother of the first individual). Further, in some cases, the first mobile device 50 and the second mobile device 60 may exchange text messages, and the computing system 12 may apply text/language processing algorithms to derive information about a relationship between the first individual and the second individual (e.g., a text message that says "You are the best sister" indicates that the second individual is the sister of the first individual). It should be appreciated that group calls and texts between multiple individuals (e.g., the first individual, the second individual, the third individual, and so on) may be assessed in similar ways. The enrollment data management system 10 may utilize one or more algorithms (e.g., machine learning algorithms) to assess the patterns of behaviors (e.g., frequency, time of day, duration/length with respect to calls and/or texts) and/or other inputs (e.g., contact labels) to determine relationships between the multiple individuals. As set forth herein, this may include using training examples for supervised or unsupervised machine learning techniques, as well as updating the one or more algorithms with new data over time.

Figure 4:
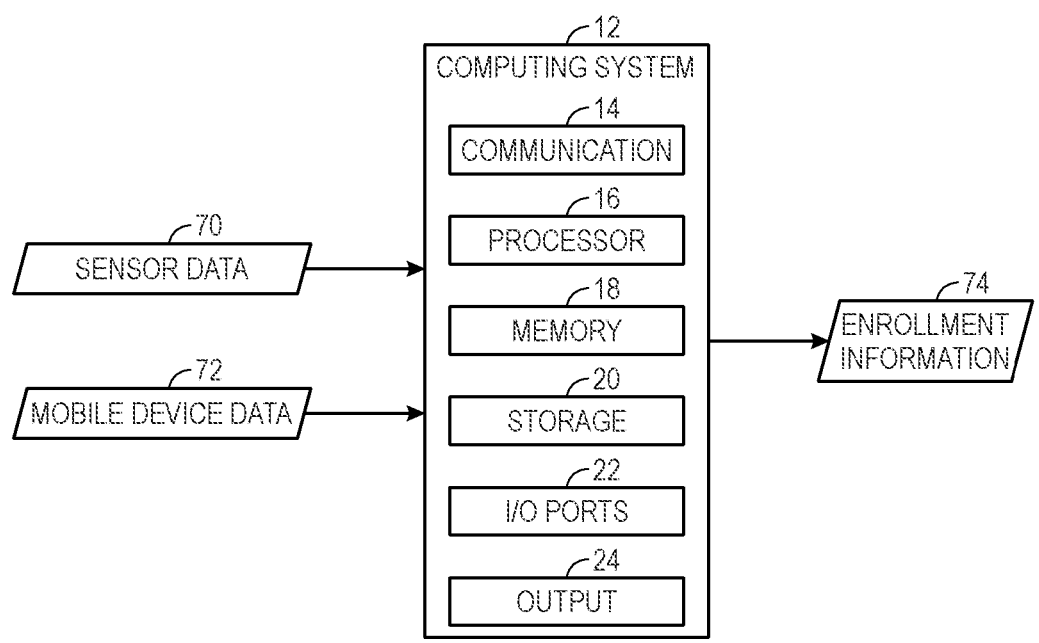
FIG. 4 is a block diagram of a computing system of the enrollment data management system of FIG. 1, in accordance with an embodiment of the present disclosure.

FIG. 4 is a block diagram of the computing system 12 of the enrollment data management system 10, in accordance with an embodiment of the present disclosure. As shown, the computing system 12 includes the processor 16, which may be any type of computer processor or microprocessor capable of executing computer-executable code. Further, the processor 16 may be representative of or include multiple processors that are part of the computing system 12 and that may perform processing operations herein described. The memory device 18 and the storage device 20 may be any suitable article of manufacture that can serve to store processor-executable code, data, or the like. These articles of manufacture may represent computer-readable media (e.g., any suitable form of memory or storage) that may store the processor-executable code used by the processor 16 to perform the presently disclosed techniques. The memory device 18 and the storage device 20 may also store data (e.g., the sensor data and/or the mobile device data), various software applications, and the like. It should be noted that non-transitory merely indicates that the media is tangible and not a signal.

The computing system 12 may also include the communication device 14 and the I/O ports 22 that operate to facilitate communication between the computing system 12 and other components of the enrollment data management system 10. The communication device 14 may facilitate network communications (e.g., wired or wireless). The I/O ports 22 may be interfaces that may communicatively couple to peripheral components, such as input devices (e.g., a keyboard, a mouse, a microphone), sensors, input/output (I/O) modules, output devices, and the like.

The computing system 12 may include the output device 24, which may include a speaker and/or a display screen (e.g., touch screen display) that function to provide relevant information to parties involved in the enrollment process (e.g., a representative of the company that provides insurance policies and/or other services to the individual upon completion of the enrollment process for the individual). The display screen may be any suitable type of display screen, such as a liquid crystal display (LCD) screen, plasma display screen, or an organic light emitting diode (OLED) display screen, for example.

It should be noted that the components described herein with regard to the computing system 12 are exemplary components and the computing system 12 may include additional or fewer components relative to what is shown. Additionally, as would be understood, it should be noted that the mobile device 50 of FIGS. 1-3 may include components similar to those described as part of the computing system 12, such as a communication device, a processor, a memory device, a storage device, and so forth. While certain operations are described as being performed by the computing system 12 to facilitate discussion, it should be appreciated that the operations may be divided in any suitable manner between the computing system 12 and any other suitable computing system having one or more processors. It should also be noted that aspects of the enrollment data management system 10 may include or work in conjunction with a cloud-based computing system, server, or the like. For example, the computing system 12 may represent a bank of servers and/or a distributed computing system that performs operations disclosed herein.

As shown in FIG. 4, the computing system 12 is configured to receive data, such as sensor data 70 and/or mobile device data 72. The computing system 12 may receive the sensor data 70 from the one or more sensors 30 of FIG. 1 and/or the mobile device data 72 from the mobile device 50 of FIGS. 2 and 3. The computing system 12 is configured to process the data, such as the sensor data 70 and/or the mobile device data 72, to determine enrollment information 74 for the individual. The enrollment information may include a residential address for the individual, a place of employment for the individual, a travel location for the individual, relationships between the individual and other individuals, and so forth. It should be appreciated that the enrollment information 74 may also include relevant information, such as information relevant to and/or about the buildings (e.g., age, construction materials, foundation type, size, flood history for the building, damage history for the building, insurance claim history for the building, weather history for a region that includes the building, crime event history for the region that includes the building, owner/tenant/employer at the building, type of business located at the building). Further, depending on the data that is available for the individual (e.g., details included in the data, which may also include scraped data), the enrollment information may include bank account information, tax information, and so forth. As discussed in more detail herein, the enrollment information 74 may be used to populate the enrollment form for the company and/or for display. In certain embodiments, the enrollment information 74 may satisfy regulations related to the enrollment process and/or may be used to complete enrollment with the company.

It should be appreciated that the enrollment information determined via the techniques of the present disclosure (e.g., based on the sensor data and/or the mobile device data) may be cross-referenced with other information from other sources, such as banking information from financial institutions and/or insurance information from insurance providers, that is already available in the one or more databases. For example, the other information from the other sources may include a residence stored in association with the individual, a place of employment stored in association with the individual, or the like, and the other information from the other sources may be obtained from previous enrollment processes completed by the individual. Differences between the enrollment information and the other information from the other sources may be identified, and relevant outputs may be provided to the individual or to the representative associated with the company (which may be the financial institutions or the insurance provider). Further, correlations (e.g., matches) between the enrollment information and the other information from the other sources this may provide additional confirmation of, and/or increased confidence in, the enrollment information. The other information may also be used as inputs into the algorithms (e.g., the machine learning algorithms) to enable the algorithms to determine the enrollment information more efficiently, which reduces processing power and improves computer operations. For example, this may enable the algorithms to look for sufficient sensor data and/or mobile device data to merely confirm the other information from the other sources, which may utilize less sensor data and/or mobile device data than generating the enrollment information without any reference to the other information from the other sources.

Figure 5:
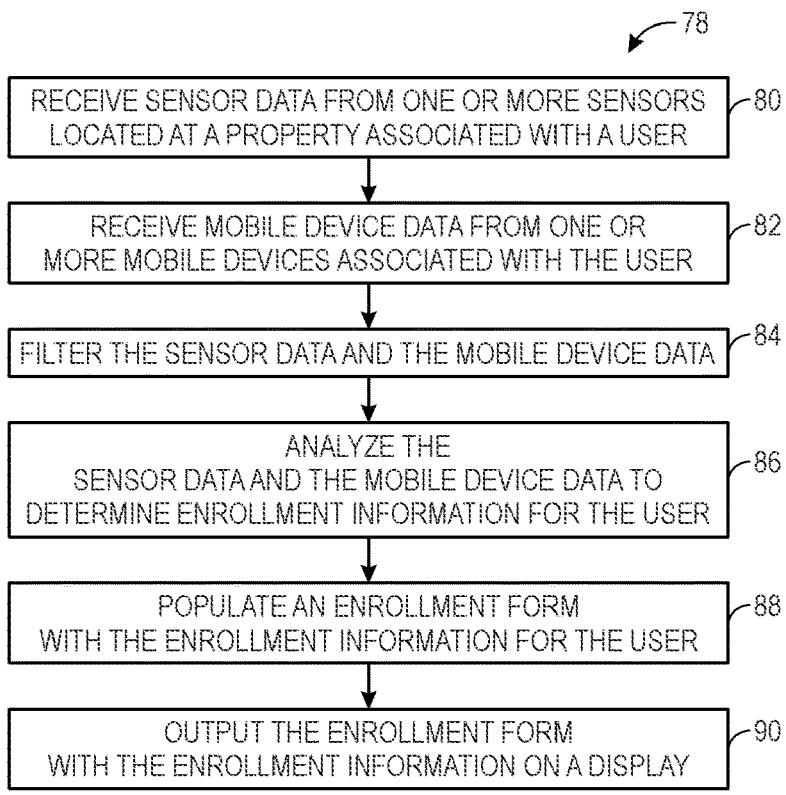
FIG. 5 is a flow diagram of a method of operating an enrollment data management system to determine enrollment information for an individual, in accordance with an embodiment of the present disclosure.

FIG. 5 is a flow diagram of a method 78 of operating an enrollment data management system, such as the enrollment data management system 10, to determine enrollment information, in accordance with an embodiment of the present disclosure. The following description of the method 78 is described as being performed by a processing system (e.g., the computing system 12), but it should be noted that any suitable processor-based device or system may be specially programmed to perform any of the methods described herein. Moreover, although the following description of the method 78 is described as including certain blocks performed in a particular order, it should be understood that the blocks of the method 78 may be performed in any suitable order, that certain blocks may be omitted, and/or that certain blocks may be added.

In block 80, the method 78 may include receiving sensor data from one or more sensors located at a property associated with an individual. The senor data may indicate entry and/or exit to the property by the individual, entry and/or exit to the property by a vehicle associated with the individual, activity within the property by the individual (e.g., logging into applications for streaming services on smart televisions), and so forth.

In block 82, the method 78 may include receiving mobile device data from one or more mobile devices associated with the individual. The mobile device data may indicate the location of the mobile device, which may indicate the location of the individual. Further, the mobile device data may indicate the individual is currently co-located with the mobile device to thereby provide further information/confirmation of the location of the individual. For example, the unlock and/or lock activity, the metadata in social media posts, the words used in text messages, outgoing calls to family members, or the like may indicate that the individual is currently interacting with the mobile device and is co-located with the mobile device. The mobile device data may also indicate relationships (e.g., familial relationships) between the individual and other individuals.

In block 84, the method 78 may include filtering the sensor data and/or the mobile device data to remove data that is not useful for a current process (e.g., a current enrollment process for the individual). In some cases, the filtering may include filtering out or discarding inconsistent sensor data. For example, the individual-specific code provided to the smart television may be associated with the individual, but previous biometric data provided to the smart lock to unlock the door to the building does not match the individual, thus, the individual-specific code provided to the smart television is discarded and is not considered to indicate the presence of the individual at the building. Similarly, the mobile device data may be discarded if the activity and inputs at the mobile device indicate use of the mobile device by another individual (e.g., logging into different social media accounts). The filtering of the data, particularly early in the process, may improve processing efficiency (e.g., block overwhelm of processing) to improve computer operations.

In block 86, the method 78 may include analyzing the sensor data and/or the mobile device data (which may have been optionally filtered in block 84) to determine enrollment information for the individual. The enrollment information may include any type of information that may be used for an enrollment process with a company and that can be derived from the sensor data, the mobile device data, and/or other data (e.g., scraped data) accessible to the processing system. For example, the enrollment information may include a residential address for the individual, a place of employment for the individual, a travel location for the individual, relationships between the individual and other individuals, account information, tax information, and so forth.

In block 88, the method 78 may include populating at least one enrollment form with the enrollment information for the individual. The enrollment form may be used as part of the enrollment process with the company, such as the enrollment process to receive a service (e.g., financial service, insurance service), complete a transaction (e.g., financial transaction), submit a job application, and so forth. For example, the enrollment form may include multiple fillable data fields, such as one data field for entry of a name of the individual, one data field for entry of a residential address of the individual, one data field for entry of a place of employment of the individual, one data field for entry of a birth date of the individual, one data field for an emergency contact and/or a reference contact for the individual, and so forth. The enrollment information determined in block 86 may be used to populate one or more of the data fields in the enrollment form, which may make the enrollment process efficient and/or also include more reliable (e.g., verified or confirmed) enrollment information in the enrollment form. For example, the residential address determined based on the sensor data and/or the mobile device data may be more reliable than an individual-supplied utility bill because the sensor data and/or the mobile device data may be more difficult to "fake" as compared to the individual-supplied utility bill.

In block 90, the method 78 may include outputting the enrollment form (and/or any of the enrollment information) on a display, such as on a display screen of the mobile device of the individual and/or on a display screen for visualization by some other individual (e.g., a representative of the company). Indeed, this may enable the individual and/or the other individual to review the enrollment information and/or to confirm the enrollment information for submission to the company for review/acceptance. In one example, the method 78 may enable the individual to prepare and submit their enrollment information based on passively collected data (e.g., the sensor data and/or the mobile device data; without the individual providing keyed inputs to type their residential address, their place of employment, and so forth). For example, the individual may open an application on their mobile device and click an icon (e.g., "Get Quote for Insurance," "Enroll in a New Bank Account") to begin an enrollment process. In response, the computing system may request and/or access the sensor data and/or the mobile device data over some prior time period (e.g., the last 30 days), process the sensor data and/or the mobile device data to determine the enrollment information, and then display the enrollment form with the enrollment information in a graphical individual interface on the display screen of the mobile device of the individual. The graphical individual interface may also prompt the individual to confirm the enrollment information and/or to submit the enrollment information. In some embodiments, the individual may be prompted to supplement the enrollment information (e.g., prompted to enter the place of employment in cases in which the computing system is unable to determine the place of employment with sufficient certainty). The enrollment information determined by the computing system based on the sensor data and/or the mobile device data may satisfy regulations related to the enrollment process, and thus, may not rely on additional verification or proof (e.g., the residential address is verified without an individual-supplied utility bill and/or without directly querying a utility service company source). In this way, the enrollment process may be more efficient and/or include more reliable enrollment information.

It should be appreciated that numerous other variations are also envisioned. For example, the computing system may periodically or continuously request and/or access the sensor data and/or the mobile device data (e.g., regardless of the individual making the request to begin the enrollment process). In such cases, the computing system may have the sensor data and/or the mobile device data available to determine the enrollment information prior to the individual making the request to begin the enrollment process. Further, in some such cases, the computing system may utilize the sensor data and/or the mobile device data to make recommendations (e.g., via notifications output on the mobile device) for the individual to initiate the enrollment process. For example, the computing system may have sufficient enrollment information for the individual and/or determine that the enrollment information qualifies the individual for a particular service (e.g., the place of employment qualifies the individual for a bank account with certain benefits). Then, the computing system may make a recommendation for the individual to initiate the enrollment process for the particular service (e.g., a notification that states, "You are eligible for a new account. We have your enrollment information. Click "yes" to continue with enrollment.").

Figure 6:
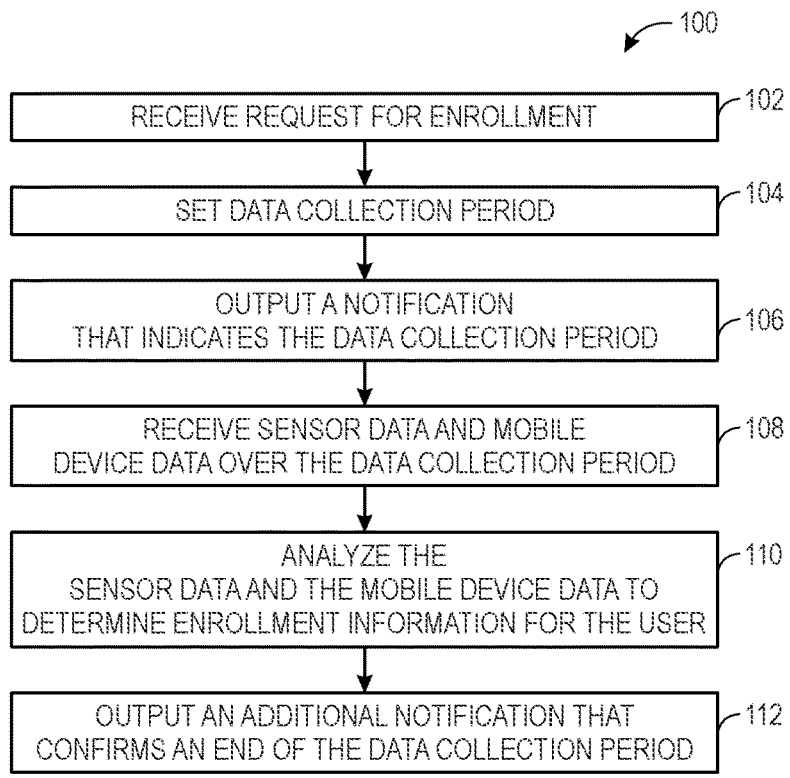
FIG. 6 is a flow diagram of a method of operating an enrollment data management system over a data collection period, in accordance with an embodiment of the present disclosure.

FIG. 6 is a flow diagram of a method 100 of operating an enrollment data management system, such as the enrollment data management system 10, over a data collection period, in accordance with an embodiment of the present disclosure. The following description of the method 100 is described as being performed by a processing system (e.g., the computing system 12), but it should be noted that any suitable processor-based device or system may be specially programmed to perform any of the methods described herein. Moreover, although the following description of the method 100 is described as including certain blocks performed in a particular order, it should be understood that the blocks of the method 100 may be performed in any suitable order, that certain blocks may be omitted, and/or that certain blocks may be added.

In block 102, the method 100 may include receiving a request for enrollment. For example, the individual may an application on their mobile device and click an icon (e.g., "Get Quote for Insurance," "Enroll in a New Bank Account") to begin an enrollment process with a company. As another example, the individual may place a phone call to a representative of the company to request the enrollment process or take some other action that operates as the request for enrollment. The request for enrollment may include authorization by the individual for the company to collect data about the individual.

In block 104, the method 100 may include setting a data collection period for the individual as part of the enrollment process. The data collection period may be any suitable time period, such as 24 hours, 48 hours, 3 days, 5 days, 7 days, 10 days, 30 days, 60 days, 90 days, or more. In some embodiments, the data collection period may be a time range, such as 24 to 48 hours, 3 to 5 days, 10 to 30 days, or the like. In some embodiments, the data collection period may be a "not to exceed" time range, such as not to exceed 24 hours, 48 hours, 3 days, 5 days, or the like. In some embodiments, the data collection period may be described as having an initial time range (e.g., a target time range) that is expected to be sufficient for data collection, but that might be extended if insufficient data is collected during the initial time range. The computing system may set the data collection period based on various factors, including the type of enrollment information used to complete the enrollment process (e.g., more enrollment information is used for a life insurance enrollment process as compared to a checking account enrollment process, and thus, the data collection period is longer for the life insurance enrollment process as compared to the checking account enrollment process). Further, the computing system may account for any enrollment information that is already established for the individual (e.g., based on prior and/or recent enrollment processes with the company). For example, the data collection period may be longer if the individual is entirely new to the company, but shorter if the individual recently completed another enrollment process with the company. The computing system may use one or more algorithms (e.g., machine learning algorithms) to determine the data collection period, as the training examples may indicate respective durations of data collection periods that were sufficient to determine (e.g., reliably determine) the enrollment information.

In block 106, the method 100 may include outputting a notification that indicates the data collection period. The notification may be presented via an output device, such as a display screen of the mobile device of the individual and/or a display screen associated with a representative of the company. In this way, the individual and/or the representative may be informed of the data collection period, which may provide some trust and/or certainty about a return to privacy for the individual. In some embodiments, the notification may include prompts/selectable icons that allow the individual and/or the representative to accept the data collection period and/or adjust the data collection period. For example, if the data collection period is 7 days, but the individual plans to travel or have guests visiting over the 7 days, the individual may provide inputs to postpone the data collection period (e.g., to a later start date). In some embodiments, the method 100 may only proceed to block 108 if (e.g., in response to) the individual and/or the representative accepting the data collection period (e.g., providing an input to indicate acceptance of the data collection period).

In block 108, the method 100 may include receiving data, such as sensor data and/or mobile device data, over the data collection period. Thus, block 108 may include receiving the sensor data from one or more sensors located at a property associated with the individual. The senor data may indicate entry and/or exit to the property by the individual, entry and/or exit to the property by a vehicle associated with the individual, activity within the property by the individual (e.g., logging into applications for streaming services on smart televisions), and so forth.

Additionally or alternatively, block 108 may include receiving the mobile device data from one or more mobile devices associated with the individual. The mobile device data may indicate the location of the mobile device, which may indicate the location of the individual. Further, the mobile device data may indicate the individual is currently co-located with the mobile device to thereby provide further information/confirmation of the location of the individual. For example, the unlock and/or lock activity, the metadata in social media posts, the words used in text messages, outgoing calls to family members, or the like may indicate that the individual is currently interacting with the mobile device and is co-located with the mobile device. The mobile device data may also indicate relationships (e.g., familial relationships) between the individual and other individuals.

In block 110, the method 100 may include analyzing the sensor data and/or the mobile device data to determine enrollment information for the individual. The enrollment information may include any type of information that may be used for an enrollment process with a company and that can be derived from the sensor data, the mobile device data, and/or other data (e.g., scraped data) accessible to the processing system. For example, the enrollment information may include a residential address for the individual, a place of employment for the individual, a travel location for the individual, relationships between the individual and other individuals, account information, tax information, and so forth.

In block 112, the method 100 may include outputting an additional notification to confirm an end of the data collection period. The additional notification may be presented via the output device, such as the display screen of the mobile device of the individual and/or the display screen associated with the representative of the company. In this way, the individual and/or the representative may be informed of the end of the data collection period, which may provide some trust and/or certainty about the return to privacy for the individual.

In some embodiments, the end of the data collection period may correspond to an expected end of the data collection period (e.g., as set in block 104). However, in some embodiments, the end of the data collection may not correspond to the expected end of the data collection period. For example, the end of the data collection period may occur prior to the expected end of the data collection period. This may occur if the sensor data and/or the mobile device data is sufficient (e.g., large volume of data, devoid of inconsistencies, consistent over time) for the one or more algorithms implemented by the computing system determine the enrollment data over a shorter period of time than expected (e.g., predicted by the computing system upon initiation of the enrollment process).

Further, the additional notification may instead indicate that the data collection period is being extended or should be extended to complete the enrollment process (e.g., extended beyond the initial time period). This may be accompanied by prompts/selectable icons that allow the individual and/or the representative to accept the extension to the data collection period and/or adjust the extension to the data collection period. In some embodiments, the method 100 may only proceed to continue to collect the sensor data and/or the mobile device data if (e.g., in response to) the individual and/or the representative accepting the extension to the data collection period (e.g., providing an input to indicate acceptance of the extension to the data collection period). Thus, the computing system may predict the data collection period, but the data collection period may be dynamically adjusted as well to complete the enrollment process. This may enable the computing system to reserve or to limit processing power in certain circumstances, such as by ending the data collection period (e.g., early) once sufficient data is obtained to determine the enrollment data.

It should be appreciated that any of the features described herein with respect to FIGS. 1-6 may be combined in any suitable manner. For example, the method 100 of FIG. 6 may also include blocks that includes populating an enrollment form and/or presenting the enrollment form on a display. While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An enrollment data management system, comprising:
one or more processors;
memory storing instructions executable by the one or more processors to cause the one or more processors to:
receive sensor data from one or more sensors located at a property, wherein the sensor data indicates a plurality of individual detection events that each indicate presence of an individual at the property;
analyze the sensor data to determine that the property qualifies as a residence of the individual;
access information relevant to the property from one or more databases; and
utilize the information relevant to the property as enrollment information for an enrollment process for the individual.

2. The enrollment data management system of claim 1, wherein the instructions are executable by the one or more processors to cause the one or more processors to utilize one or more machine learning algorithms to analyze the sensor data to determine that the property qualifies as the residence of the individual.

3. The enrollment data management system of claim 1, wherein the one or more sensors comprise a camera, a smart lock, a smart appliance, a smart television, or any combination thereof.

4. The enrollment data management system of claim 1, wherein the one or more sensors comprise a biometric sensor.

5. The enrollment data management system of claim 1, wherein the information relevant to the property comprises a street address of the property.

6. The enrollment data management system of claim 1, wherein the instructions are executable by the one or more processors to cause the one or more processors to:
receive mobile device data from a mobile device associated with the individual, wherein the mobile device data indicates a plurality of mobile device detection events that each indicate presence of the mobile device at the property; and
analyze the sensor data and the mobile device data to determine that the property qualifies as the residence of the individual.

7. The enrollment data management system of claim 6, wherein the mobile device data indicates an additional plurality of individual detection events that each indicate presence of the individual with the mobile device at the property.

8. The enrollment data management system of claim 7, wherein the mobile device data comprises unlock activity, lock activity, or both that indicates the additional plurality of individual detection events.

9. The enrollment data management system of claim 6, wherein the mobile device data indicates an additional plurality of mobile device detection events that each indicate presence of the mobile device at an additional property, and the instructions are executable by the one or more processors to cause the one or more processors to:
analyze the mobile device data to determine that the additional property qualifies as a place of employment of the individual;
access respective information relevant to the additional property from the one or more databases; and
utilize the respective information relevant to the additional property as additional enrollment information for the enrollment process for the individual.

10. The enrollment data management system of claim 6, wherein the mobile device data indicates communication between the mobile device and an additional mobile device, and the instructions are executable by the one or more processors to cause the one or more processors to:
analyze the mobile device data to determine a relationship between the individual associated with the mobile device and an additional individual associated with the additional mobile device; and
utilize the relationship as additional enrollment information for the enrollment process for the individual.

11. The enrollment data management system of claim 1, wherein the instructions are executable by the one or more processors to cause the one or more processors to:
receive a request from the individual to initiate the enrollment process;
in response to the request, establish a data collection period; and
receive the sensor data from the one or more sensors located at the property over the data collection period.

12. The enrollment data management system of claim 11, wherein the instructions are executable by the one or more processors to cause the one or more processors to output a notification on a display screen, wherein the notification comprises an indication of the data collection period.

13. The enrollment data management system of claim 1, wherein the instructions are executable by the one or more processors to cause the one or more processors to:
populate a data field of an enrollment form with the information relevant to the property; and
output the enrollment form on a display screen for visualization by the individual, another individual, or both.

14. A method of operating an enrollment data management system, the method comprising:
receiving, at one or more processors, sensor data from one or more sensors located at a property, wherein the sensor data indicates a plurality of individual detection events that each indicate presence of an individual at the property;
analyzing, via the one or more processors, the sensor data to determine that the property qualifies as a residence of the individual;
accessing, via the one or more processors, information relevant to the property from one or more databases; and
utilizing, via the one or more processors, the information relevant to the property as enrollment information for an enrollment process for the individual.

15. The method of claim 14, comprising utilizing, via the one or more processors, one or more machine learning algorithms to analyze the sensor data to determine that the property qualifies as the residence of the individual.

16. The method of claim 14, comprising:
receiving, at the one or more processors, mobile device data from a mobile device associated with the individual, wherein the mobile device data indicates a plurality of mobile device detection events that each indicate presence of the mobile device at the property; and
analyzing, via the one or more processors, the sensor data and the mobile device data to determine that the property qualifies as the residence of the individual.

17. The method of claim 14, comprising:
receiving, at the one or more processors, a request from the individual to initiate the enrollment process;
establishing, in response to receiving the request and using the one or more processors, a data collection period; and
receiving, at the one or more processors, the sensor data from the one or more sensors located at the property over the data collection period.

18. An enrollment data management system, comprising:
one or more processors;
memory storing instructions executable by the one or more processors to cause the one or more processors to:
receive sensor data from one or more sensors located at one or more properties, wherein the sensor data indicates a plurality of individual detection events that each indicate presence of an individual at the one or more properties;
receive mobile device data from a mobile device associated with the individual, wherein the mobile device data indicates a plurality of mobile device detection events that each indicate presence of the mobile device at the one or more properties;
analyze the sensor data, the mobile device data, or both to identify a first property of the one of the one or more properties as a residence of the individual;
access information relevant to the first property of the one or more properties from one or more databases; and
generate enrollment information based on the information relevant to the first property of the one or more properties as part of an enrollment process for the individual.

19. The enrollment data management system of claim 18, wherein the instructions are executable by the one or more processors to cause the one or more processors to:
analyze the sensor data, the mobile device data, or both to determine that a second property of the one or more properties qualifies as a place of employment of the individual;
access additional information relevant to the second property of the one or more properties from the one or more databases; and
generate additional enrollment information based on the additional information relevant to the second property of the one or more properties as part of the enrollment process for the individual.

20. The enrollment data management system of claim 18, wherein the instructions are executable by the one or more processors to cause the one or more processors to:
populate a data field of an enrollment form with the enrolment information; and
output the enrollment form on a display screen for visualization by the individual, another individual, or both.

* * * * *